UNITED STATES PATENT OFFICE.

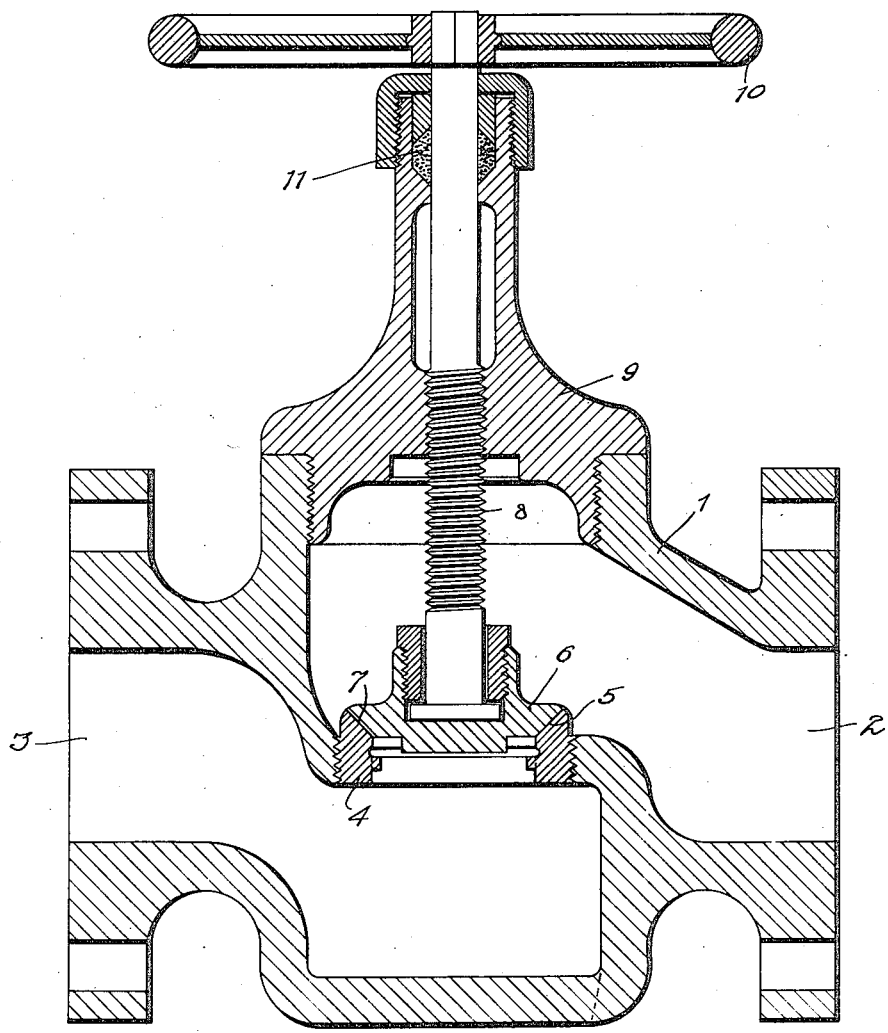

JOHN M. PALMER, OF CHICAGO, ILLINOIS.

VALVE.

1,265,495.

Specification of Letters Patent.   Patented May 7, 1918.

Application filed October 15, 1915.   Serial No. 56,014.

*To all whom it may concern:*

Be it known that I, JOHN M. PALMER, a citizen of the United States, residing at Chicago, in the county of Cook and State of Illinois, have invented a certain new and useful Improvement in Valves, of which the following is a full, clear, concise, and exact description, reference being had to the accompanying drawings, forming a part of this specification.

My invention relates to valves, and particularly to that class of valves which are employed for controlling the flow of fluid under pressure.

In devices of this kind a common difficulty has been due to the fact that the valve member and valve seat, particularly the latter, are cut or worn away by the passing fuel are, cut or worn away by the passing fuel and to overcome this, as far as possible, hardened steel and other special materials are employed. These special materials are expensive and are, nevertheless, subject to considerable wearing by the action referred to.

It is the object of my invention to provide a more durable valve and to this end I have made extensive experiments and tests. I have finally, however, departed from the teachings of the art and now employ a valve seat and valve face of chilled iron. I am aware that chilled iron, in and of itself is old, but so far as I know I am the first to employ chilled iron seats and faces in the valves of which that illustrated in the accompanying drawing is an example. In this drawing, the body is shown at 1 and the inlet and outlet at 2 and 3, respectively. The inner end of the outlet passageway is surrounded by a removable ring seat 4, surrounded by a removable ring seat 4, screwed into place, as shown. This seat, in its formation, is of metal preferably iron, cast against a chill at the surface 5.

Coöperating with this seat is a valve member 6 which, in its formation, is of metal, preferably iron, cast against a chill at the surface 7. The member 6 is carried at the lower end of a stem 8, threaded in a cover 9, and provided with a hand wheel 10, the usual stuffing box 11 being provided.

I find by experiment that a valve member and valve seat of the nature described is peculiarly and specially adapted for the use described. It withstands the wear beyond the hardest valve members and seats of the art and the material is considerably less expensive. Furthermore, the mechanical operations required in construction are effectively reduced. Since it is only the faces, which otherwise would be detrimentally affected by the passing fluid such as steam, which are made highly resistant in this way, the remainder of the structures are properly soft for machining and finishing as required in structures of this sort.

I claim:

1. In combination, a valve chamber having an inlet and an outlet and a port connecting them, a valve seat surrounding said port, said valve seat having its engaging surface of chilled metal but being otherwise soft and a valve member having a face for face to face engagement with said seat.

2. In combination a valve chamber having an inlet and an outlet and a port connecting them, a valve seat surrounding said port, said valve seat having its engaging surface of chilled metal but being otherwise soft and a valve member having a face for face to face engagement with said seat, said valve member having its engaging face of chilled metal but being otherwise soft.

3. In combination a valve chamber having an inlet and an outlet and a port connecting them, a valve seat surrounding said port, said valve seat having its engaging surface of chilled iron but being otherwise soft and a valve member having a chilled face for face to face engagement with said seat.

In witness whereof, I hereunto subscribe my name this 13th day of October, A. D. 1915.

JOHN M. PALMER.